United States Patent [19]

Lerner

[11] 4,022,593
[45] May 10, 1977

[54] MIST ELIMINATION

[76] Inventor: Bernard J. Lerner, 727 Orchard Hill Drive, Pittsburgh, Pa. 15235

[22] Filed: May 5, 1975

[21] Appl. No.: 574,268

[52] U.S. Cl. .................................... 55/90; 55/259; 55/424
[51] Int. Cl.² ..................................... B01D 47/02
[58] Field of Search ................ 55/97, 259, 90, 329, 55/482, 484, 486, 488, 489, 501, 528, DIG. 16, DIG. 25, 527, 424, 466, 525, 526

[56] References Cited

UNITED STATES PATENTS

| | | | |
|---|---|---|---|
| 2,478,097 | 8/1949 | Glanzer | 55/528 |
| 3,022,859 | 2/1962 | Sexton | 55/259 X |
| 3,066,462 | 12/1962 | Yap et al. | 55/DIG. 25 |
| 3,107,986 | 10/1963 | Plant et al. | 55/97 |
| 3,135,592 | 6/1964 | Fairs et al. | 55/DIG. 25 |
| 3,237,812 | 3/1966 | Kemp | 55/DIG. 25 |
| 3,440,018 | 4/1969 | Eckert | 55/259 |

Primary Examiner—Frank W. Lutter
Assistant Examiner—David L. Lacey
Attorney, Agent, or Firm—Hymen Diamond

[57] ABSTRACT

A mist eliminator for liquid-gas contacting apparatus for removing the mist from the mist-containing gas of the apparatus. This mist eliminator includes a porous pad, the up-stream surface of which is engaged by one or more fibrous bodies permeable to the liquid and spaced along the up-stream surface of the pad. The fibrous bodies are spaced apart from each other so as not to impede the flow of the liquid or mist-containing gas. The bodies drain the layer of liquid downstream from the up-stream surface of the pad; the liquid flowing in thin streams through the centers of the bodies. The streams are shielded from reentrainment in the gas by the fibrous portion of the body surrounding the streams. The hydrostatic head of the streams is sufficient to cause the liquid to emerge from the drainage bodies in drops too large to be readily reentrained by the gas.

13 Claims, 16 Drawing Figures

MIST ELIMINATOR

MIST ELIMINATION

REFERENCES TO RELATED DOCUMENTS

The following U.S. Patents are illustrative of the prior art: Otto, U.S. Pat. No. 2,645,560; Maisel, U.S. Pat. No. 2,784,132; Hoover, U.S. Pat. No. 2,958,593; Sexton, U.S. Pat. No. 3,022,859; Sinex U.S. Pat. No. 3,190,057; Eckert U.S. Pat. No. 3,440,018; Taylor U.S. Pat. No. 3,526,557;

BACKGROUND OF THE INVENTION

This invention relates to liquid-gas contacting and has particular relationship to mist elimination in liquid-gas contacting. Liquid-gas contacting takes place in such operations as distillation or fractionation, gas scrubbing, evaporative cooling (water-cooling towers), trickle equipment for sewage aeration and the like. In such operations, the gas stream generally entrains the liquid as mist or drops as a result of the contact and it is often desirable that the liquid be removed from the gas. Mist eliminators serve the purpose of removing the liquid mist from the gas. In accordance with the teachings of the prior art, porous-pad demisters are provided for this purpose.

Mist eliminator pads may be made of woven or knitted mesh screen, expanded metal or of bonded non-woven construction, an example of which is described by Taylor. A typical widely-practiced method of making a pad mist eliminator is to knit or weave metal or plastic filament into a circular mesh sleeve or cylinder, which is then flattened, stacked and formed into a circular or rectangular pad to fit the appropriate containing vessel space. Another typical mist-eliminator pad material is described by Sinex, which discloses as a demister element an open-celled reticulated polyurethane foam manufactured by the Scott Paper Company, Chester, Pa. These materials and constructions and others similar to them yield a mist eliminator pad that is characterized macroscopically by uniformity of gas-flow resistance across the pad. In other words, microscopically the pores may be of random size and shape distribution, but macroscopically the gas flow is uniform. To minimize gas-flow resistance, the overall void space is generally very high, usually greater than 90%. Prior-art pads of this type have relatively high operating wet-gas-flow resistance as compared to the dry-gas-flow resistance (i.e., resistance to flow of gas containing no moisture). Such pads also manifest a tendency to fill with captured liquid mist, i.e., to flood. Flooding means that the mist-eliminator pad manifests a condition in which the liquid content of the pad rises rapidly, gas-pressure drop increases steeply, and ultimately liquid spray breaks through on the down-stream side of the pad.

It has been realized that the above-described functional disadvantages arise from the fact that both the upflowing gas and the down-draining trapped-out liquid mist must compete with each other for the same flow space within the interstices of the mist-eliminator pad. there are no effective preferred liquid-drainage channels or low-resistancce liquid flow paths, nor are there any low-resistance portions of the pad for preferential gas flow. The pad and its thickness present to the gas a macroscopically uniform flow transit resistance, indeed such uniformity is widely held to be desirable.

Where a demister pad is horizontally disposed so that the gas-flow is vertically upward or is inclined at an angle such that the gas-flow is prediminantly vertically upward, the liquid drains through the pad under the force of gravity. However, the drainage is hindered by the interacting interfacial tension forces near the upstream side of the pad. The forces involved are the interacting molecular forces of the metal or other material of the pad, the gas, and the draining liquid. Another major factor hindering drainage of the demister pad is the momentum transfer and friction of the gas stream flowing wholly or partly counter to the direction of drainage.

As a result of these factors, the disentrained liquid collects as a continuous layer immediately above the upstream surface of the pad, or, in the case of an inclined pad, immediately above a large portion of this surface. The gas must then necessarily bubble as the discontinuous phase through the liquid layer, giving rise to high gas flow resistance relative to the dry pad and a ready tendency to flood, particularly at relatively low and moderate liquid loadings. Conventional entrainment elimination pads thus have limited liquid handling capacity and cannot operate at high liquid loadings. Generally such prior-art pads are limited to loadings less than approximately 0.5 GPM/sq. ft. of surface area. For this reason, it is customary to place the mist eliminator pad as far as possible from the source of the liquid entrainment, i.e., from the region from which the liquid-containing gas emerges, to permit gravity attenuation of the liquid carryover. This is not an economically satisfactory solution because the entrainment decay distance required is bought at the expense of additional shell or equipment volume to achieve this distance.

Sexton, Otto and Eckert disclose attempts to resolve the flow and pressure-drop limitations of the prior-art pad mist eliminators. Both Sexton and Otto employ mist eliminator structures disposed at a large angle to the horizontal to facilitate liquid-drainage along the inclined pad into either external drain channels, in the case of Sexton, or onto the interior circumference of the containing vessel wall, in the case of Otto. Eckert discloses the use of an undulating foraminous plate as a mist-eliminator support and liquid redistributor. It has been realized in considering the effectiveness of Eckert that the up-flowing gas and its accompanying mist loading must necessarily flow through the foramina in Eckert's undulating plate support, and that this plate would manifest the undesirable liquid-gas counterflow properties of the demister pad. The planar-surface, essentially two-dimensional, foraminous plate subjects the liquid-film-wetted surface in its holes to direct gas frictional drag. Because of the gas drag and impact on the unprotected liquid surfaces, the draining liquid is subject to retardation and hindered flow, and the foraminous support plate is itself subject to flooding. Further, interposition of any foraminous plate in a two-phase liquid-gas flow system causes an incremental gas-flow resistance over that of the pad alone, and added resistance to gas flow is economically undesirable.

It is an object of this invention to overcome the disadvantages and the deficiencies of the prior art and to provide a method of mist elimination and a mist eliminator which shall have a substantially higher liquid-handling capacity and shall be capable of operating at substantially higher liquid mist loadings than prior-art mist eliminators, without excessive pressure loss or flooding. It is also an object of this invention to provide such a mist eliminator in whose operation the liquid shall be effectively drained therefrom, while the liquid is protected from the frictional forces of the counterflowing gas stream, and the drained liquid shall emerge in large enough drops to resist reentrainment by the gas.

SUMMARY OF THE INVENTION

This invention arises from the realization that for effective mist elimination the draining stream must be shielded from the impeding action of, and from reentrainment by, the counterflowing gas. In accordance with this invention, the draining liquid is shielded from the counterflowing gas and emerges from the mist eliminator in large drops which resist reentrainment by the counterflowing stream.

A mist eliminator is accordingly provided which includes gas-shielded liquid-drainage means comprising one or more filamentary or fibrous bodies. When used alone in this specification or in the claims, the word "fibrous" is intended to include within its scope filamentary; the word "fibrous" is also intended to include within its scope wire screens, fibrous mats, brush bristles, ribbons, such as are included in steel wool and the like. By reason of the Coanda effect, the fibrous bodies drain the liquid from the liquid layer above the upstream surface of the mat.

The Coanda effect is the tendency of a liquid to flow under gravity along a liquid conductor contacting the liquid. For example, if one touched, with a finger, water flowing out of a faucet, water contacting the finger will flow along the finger and will be diverted from the direct stream from the faucet. The fibers of the fibrous body contact the liquid layer and as required by the Coanda effect, the liquid drains out of the layer through the fibers.*

*Stanley W. Angrist, Scientific American, Volume 211, pp 80-88, particularly P. 83.

These bodies engage the pad on its up-stream surface with their axes oriented transversely to the direction of gas flow, and, where there is more than one body, are spaced apart from each other. Although the cross-sectional shape of such filamentary or fibrous bodies may be of any conveniently fabricable form, the preferred cross-section is cylindrical, having a diameter or mean cross-sectional dimension relatively small compared to the diameter of the mist eliminator pad or the containing vessel of the liquid-gas contact apparatus. The filamentary body diameter should be large enough to provide for ample liquid hydrostatic head within the body which in conjunction with an appropriate number of bodies provides sufficient liquid drainage capacity to handle the maximum liquid entrainment load. For conventional demister pads having no appreciable capillarity, it is desirable that the diameter of the fibrous liquid drainage body be in the range of 25% to 75% or 100% of the depth or thickness of the mist-eliminator pad with the greater thicknesses corresponding to the lower surface-tension liquids relative to water. For demister pads of appreciable capillarity, which hitherto have not been widely used, the drainage body may be substantially longer than the thickness of the demister pad; indeed the depth of the body demanded is a function of the capillarity of the liquid. For such capillary demister pads, it is desirable to use as a drainage body a fibrous member having equal or greater capillarity for the liquid than the demister pad.

Each drainage body should have a high void space typically of a volume of 90% the volume of the body.

The fibrous body liquid drainage means of this invention may take a number of different forms, but the common property of these various fibrous bodies is that they provide liquid drainage paths. Because liquid drainage in a fibrous or filamentary body tends to channel vertically through the body under the influence of gravity, protection of the draining liquid stream from gas flow drag and momentum transfer is provided by buffering layers or rows of fibers which surround and extend into space normal to the drainage direction. When more than one body is used, these must be necessarily spaced apart so that the space between the bodies provides for the gas a preferred low-resistance flow region, thus effectively separating the upflowing gas from the downflowing liquid.

Actual experience with the mist eliminators according to this invention has revealed that the mist eliminator according to this invention has radically lower gas pressure drop and radically higher flood capacity as compared to prior-art mist eliminators.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

Figure 1:
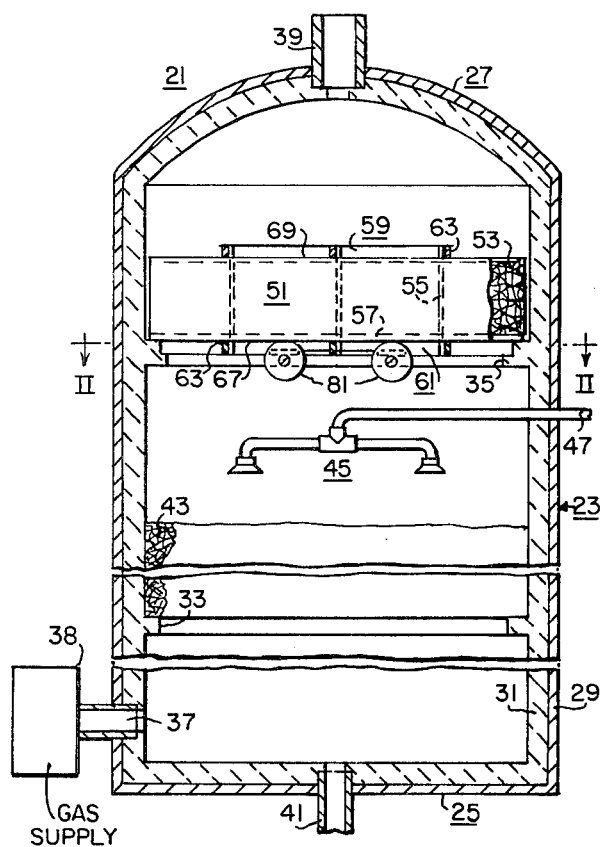
FIG. 1 is a view partly in longitudinal section and partly in elevation showing liquid-gas contacting apparatus including a mist eliminator according to this invention.
Figure 2:
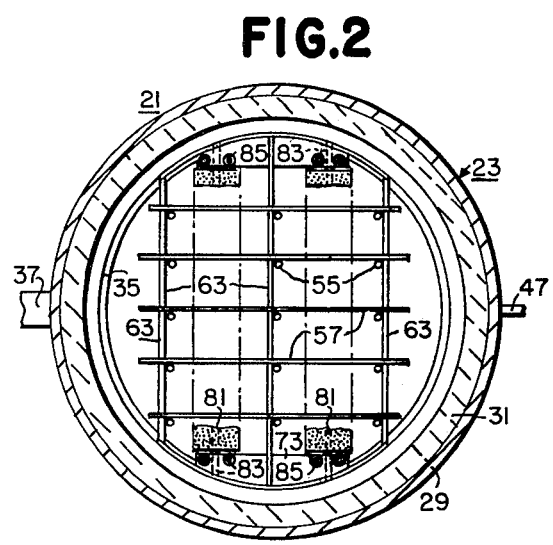
FIG. 2 is a view in transverse section taken along line II—II of FIG. 1.
Figure 5:
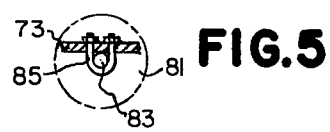
FIG. 5 is a fragmental view in end elevation showing how the body draining the porous pad of the mist eliminator according to this invention is secured.
Figure 4:
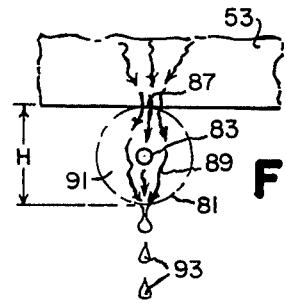
FIG. 4 is a fragmental diagrammatic view illustrating an aspect of this invention.
Figure 3:
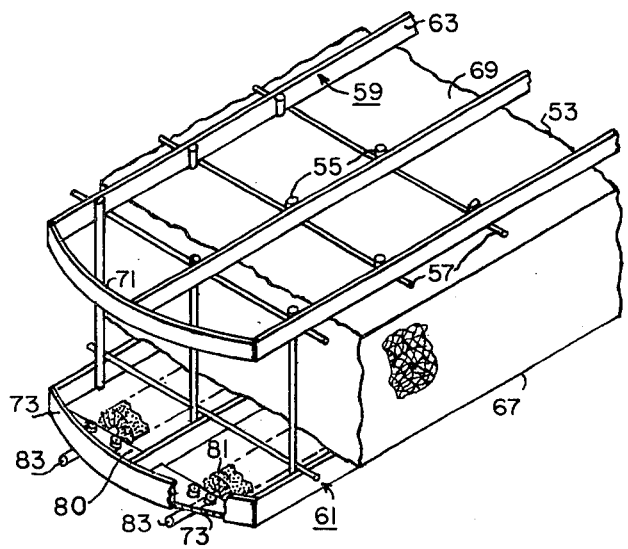
FIG. 3 is an isometric view of the mist eliminator shown in FIGS. 1 and 2.

The apparatus shown in FIGS. 1 through 5 includes a treating tower 21 for treating a gas by liquid-gas contacting to remove impurities or other undesirable constituents of the gas. The tower 21 typically has cylindrical walls 23 with a flat base 25 and a dome-shaped top 27. Typically, the tower 21 may be composed of an outer shell 29 of metal lined with an appropriate metal-protecting (or for certain purposes refractory) lining 31. The lining 31 has internally extending annular ledges 33 and 35. The tower 21 includes an inlet 37 for the gas from a gas supply 38 to be contacted or treated and an outlet 39 for the gas which has been contacted. The tower also has a drain outlet 41 for the contacting liquid.

On ledge 33 a liquid-gas contacting bed 43, which is gas and liquid permeable, is supported. The bed 43 may be of any type capable of assuring adequate interaction of the gas and liquid. The contacting liquid is provided by a spray 45 whose supply conductor 47 penetrates through the wall 23. The spray 45 is supported from the tower 31 by an appropriate support (not shown).

The apparatus also includes a mist eliminator or demister 51 which is supported on the ledge 35. The mist eliminator 51 includes a liquid-permeable porous pad 53 which removes the liquid from the liquid-containing gas. The pad 53 is held together by a three-dimensional grid including rods 55 penetrating through the pad 53 and cross rods 57. The rods 55 and 57 are welded at their upper and lower ends to frames 59 and 61, respectively. Each frame 59 and 61 includes a plurality of strips 63 extending along the up-stream and down-stream surfaces 67 and 69 of the pad 53 and arcuate cross strips 71 and 73. The cross strips 73 are of angular transverse cross section.

The mist eliminator 51 also includes gas-shielded draining means for the liquid which accumulates above the up-stream surface 67 (usually the lower surface) of the pad 53. This draining means includes a plurality of fibrous bodies 81 permeable to the liquid. The bodies 81 are shown as of cylindrical form, but they may have other forms; for example, they may be elongated parallelepipeds, or they may have irregular forms. A rod 83 passes through each body. Where the body is a cylinder, the rod 83 typically extends along the axis of the body. The rods 83 are secured by U-bolts 85 (FIG. 5) to the surfaces of the angles 73 which extend parallel to the up-stream surface 67 of pad 53. The rods 83 extend under the horizontal sides 80 of the angles 73 and are supported on the ledge 35. The pad 53 is supported on the fibrous bodies 81, the up-stream surface of the pad being firmly engaged by the contiguous portions of the surfaces of the bodies 81.

Figure 7:
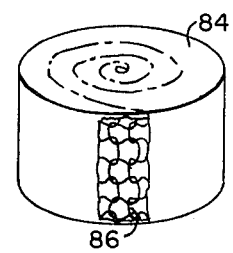
FIG. 7 is a view in perspective showing a mist eliminator in accordance with the prior art.
Figure 9:
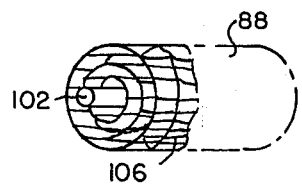
FIG. 9 is a view in perspective of a wire screen draining body of a mist eliminator in accordance with this invention.

Typically, the pad 53 may be a tightly spirally-wound roll 84 (FIG. 7) of knitted TEFLON (tetrafluoroethylene) filaments 86. The filaments have a diameter of about 250 microns. The fibrous bodies 81 may take a number of forms. A demister 51 according to this invention includes a fibrous body 81 of a cylindrical spirally wound roll 88 (FIG. 9) of screen or mesh material, several layers deep, placed longitudinally along the bottom of, and in contact with, the mist eliminator pad 53, transverse to the direction of gas flow. Mechanical support for the roll is provided by the central support rod or tube 102 around which the mesh or screen is rolled. In the case of knitted-mesh pad eliminators, the mesh material which is used to form the fibrous-liquid drainage body 81 may advantageously be the same mesh material which is used to form the mist eliminator pad 53.

Figure 11:
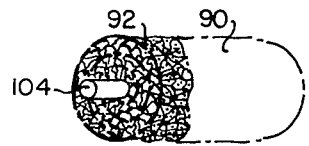
FIG. 11 is a view in perspective of a draining body of anisotropic non-woven mat of a mist eliminator in accordance with this invention.

A second form of the fibrous body of demister 51 according to this invention comprises a cylindrical spirally-wound roll 90 (FIG. 11) of a bonded, non-woven, high loft fibrous pad, such as is shown in Maisel patent or Hoover patent. This roll may also be supported by a central core or support member 104 about which the roll is formed. Typically, the filaments 92 of this roll 90 have a diameter of about 150 microns. One or more of these assemblies 90 is pressed into contact with the up-stream face of the pad 53 to provide the protected liquid drainage of this invention. In both this form and the screen or mesh roll 88, a desirable feature is introduced: that of anisotropic orientation of the fiber, or filament layers in the fibrous body 88 or 90. In the cylindrical roll form of either screen or bonded, non-woven sheet, the anisotropy of the fibrous body is such that the body formed consists of concentric layers of fibers or filaments 106 (FIG. 9) or 92 (FIG. 11), with such layers generally lying parallel to the path of gas flow around the cylinders. The presentation to the flowing gas of successive concentric layers of high-drag gas-momentum-absorbing fibers results in protected flow paths for the liquid draining through the rolls (88 or 90). Thus, gas flow penetration to the surface of the draining liquid stream is prevented, and lower-resistance gas flow paths are created between the fibrous bodies.

Figure 13:
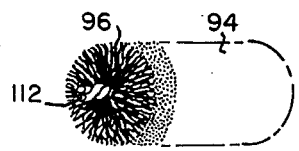
FIG. 13 is a view in perspective of a draining body of a mist eliminator according to this invention, including a central axis from which bristles extend radially.

A third form of the fibrous body of this invention, which has a different type of fiber orientation anisotropy, but which is as effective as the other forms described above, comprises a cylindrical spiral or helical brush-like member 94 (FIG. 13) consisting of a multitude of stiff filaments or bristles 96 arranged in a radial array, affixed to a central rod or tube twisted wire helix or helically-wound channel 112. Typically, the bristles 96 have a mean diameter of about 0.010 –0.014 inch. When placed in contact with up-stream face of the pad 53, in transverse orientation with respect to gas flow, the fibers or filaments 96 penetrate through the pad 53 and serve as preferred liquid conductance paths. Liquid drainage is conducted vertically down the pad-contacting fibers to the axial region of the body 94, and then spreads radially outward in the lower portion of the body 94 in a fan-shaped cross-sectional flow pattern. Protection of the liquid from gas frictional forces in this case is provided principally by the variation of the spatial density or anisotropy of the fibers 96 in the radial direction. Because the density of fiber spatial population increases as the region of the core 112 is approached, significant gas flow penetration to the central regions where the bulk of liquid flow occurs is prevented. Additional gas-flow buffering action at the point of liquid pickup from the pad 53 is provided by the presentation to the gas of buffering rows of non-conducting filaments 96 external to the pad-contacting conducting fibers.

Another body for practicing this invention is a roll 98 (FIG. 15) of carded steel wool.

While the cylindrical fibrous bodies 88, 90, 94, 98 described above are members which are separately made and appended to the mist eliminator pad 53, it is recognized that it is possible in some cases to fabricate these fibrous bodies as an integral part of the pad. Also, although the cross-sectional cylindrical shape of the fibrous body of this invention has been described as circular in form, the cross-section may also be elliptical, square, rectangular, or other fabricable shape. The fibers or filaments used in the fibrous assemblies of this invention may be made of any suitable metal, plastic, or glass material, which may or may not be similar to that of the mist eliminator pad material itself.

In the practice of this invention, the liquid-containing gas flows from the bed 43 through the mist-eliminator pad 53. The pad 53 removes the liquid and it flows through the pad 53 to the up-stream surface 67. Instead of collecting above the surface, the liquid flows through the contact regions 87 (FIG. 4) which are less than the maximum transverse cross-sectional area of the bodies 81, between the bodies 81 and the pad 53, and thence in a stream 89 through the center portion of the body 81. The stream 89 is shielded from the liquid-containing gas from the bed 43 by the portion 91 of the fibrous body around the stream 89. The dimension H of the body 81 in the vertical direction should be sufficiently large so that the hydrostatic head across the stream is high enough to cause the liquid to be discharged from the body in relatively large drops 93. Such relatively large drops are not readily reentrained by the upwardly flowing gas.

Figure 6:
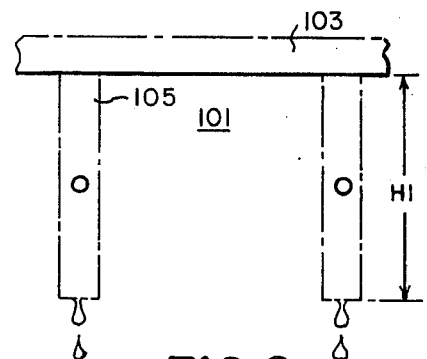
FIG. 6 is a view in side elevation showing a modification of this invention.

The pad 53 and body 81 of the demister shown in FIGS. 1 through 5 are structured so that they have substantially no appreciable capillarity for the liquid. FIG. 6 shows a demister 101 including a pad 103 having appreciable capillarity with respect to this liquid. The demister 101 includes draining bodies 105 which have the same or higher capillarity with respect to the liquid. The bodies 105 act like blotting paper to absorb the liquid from the pad 103. The draining bodies 105 should have a vertical dimension relatively high compared to the thickness of the pad 103 so that there is sufficient hydrostatic head H1 to cause the liquid to drain from the bodies 105.

The most surprising and unexpected feature of the action of this invention with its fibrous drainage bodies 81, 88, 90, 94, 98 revealed itself in the course of performance tests. These tests showed that the mist eliminator according to this invention with the fibrous drainage bodies in contact with the up-stream surface of the pad 53 resulted in a reduction in operating gas pressure drop of more than 50% during mist elimination, returning the pressure drop virtually to that shown by the dry pad alone.

These tests were conducted in a 6-inch diameter vertical tower, using a commercial knitted-mesh Teflon pad 53 4 inches deep. The mist loading was provided by a No. 5 Spraying Systems Company "Fulljet" spray nozzle, positioned three inches below the pad, spraying water upwardly at the pad, concurrent with air flow upwardly through this pad. Air flow was provided by means of a centrifugal pressure blower and air flow was metered by means of a calibrated sharp-edged 1.75-inch orifice. The liquid supply to the spray nozzle was metered with a Fischer and Porter rotameter and was maintained throughout the mist loading runs at 0.5 GPM (gallons per minute). The pressure drop across the pad was measured be means of an inclined water manometer. Tests were made by measuring the air pressure loss across the pad for increasing increments of gas flow.

Figure 8:
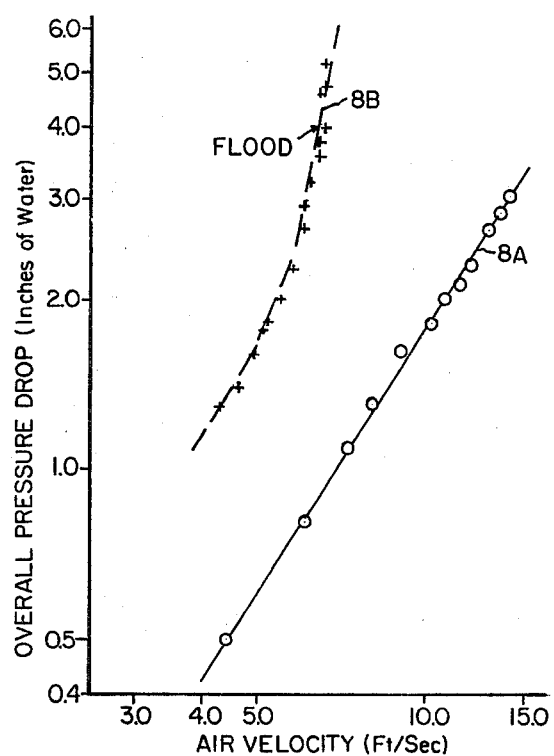
FIG. 8 is a graph comparing the pressure drop as a function of the gas velocity of a mist-loaded and dry mist eliminator as shown in FIG. 7.

The initial test was made on the dry pad 84, and was then repeated with the face-sprayed pad to establish the necessary base data for the dry pad and the operating pad. These data are shown graphically in FIG. 8. Pressure drop in inches of water is plotted vertically and gas velocity in feet per second is plotted horizontally. Curve 8A is the curve for the dry pad, and curve 8B for the mist-loaded pad 84. As is shown in FIG. 8, the effect of mist loading on the pressure drop across the pad 84 is more than double the pressure drop across the dry pad for the same gas velocity. Further, line 8B for the mist-loaded pad shows a break-point between 5 and 6 ft./sec., and a flood point of about 6.5 ft./sec., as evidenced by the pressure drop in inches of water equal to the pad depth of 4 inches. There was visual observation of spray carryover above the pad at this point.

Figure 10:
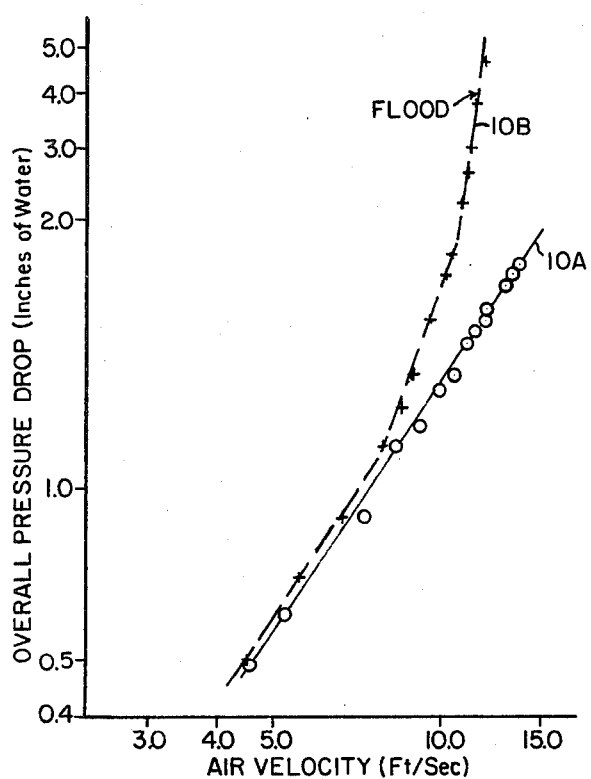
FIG. 10 is a comparison graph similar to FIG. 8, but produced with a mist eliminator in accordance with this invention including a plurality of draining bodies as shown in FIG. 9.

The next test was performed with a mist eliminator 51 in which three rolls 88 of ¼ inch by ¼-inch wire mesh, each comprising five layers, having an outside diameter of 1 inch and a length of 3 inches, were placed horizontally in engagement with the pad 84. The position of the pad was adjusted so that the bottom face remained the same distance from the nozzle as it had been in the test with the pad 84 above. The pressure drop versus gas velocity characteristic then determined for the dry pad 84 and screen roll 88 combination and then for the mist-loaded combination. This data is shown in FIG. 10, in which pressure drop is plotted vertically and velocity horizontally. Curve 10A is the graph for the dry run and curve 10B is the graph for the irrigated run. Comparison of FIGS. 8 and 10 shows that there is very little difference between the dry runs. Comparison of curve 10B with 8B shows that the fibrous-body support strikingly reduces the mist-loaded gas flow resistance of the pad to virtually that of the dry pad alone or approximately to 50% of that of the mist-loaded pad without the fiber-body 88 drainage means. Additionally, the apparent break-point in the mist-loading curve velocity was increased to about 8 feet/second with the fiber drainage bodies from 5.5 feet/second without the bodies, and the flood-point velocity was increased to approximately 11 feet/second from the value of 6.5 feet/second for the pad 84 alone. The increase in flood points capacity is striking, but the decrease in pressure drop caused by the addition of the fiber bodies (curves 8B and 10B) is wholly unexpected and surprising. The constriction of gas flow caused by the screen rolls and the additional flow resistance caused by the interposition of these bodies would normally be expected to increase the total gas flow resistance, particularly for the wetted or mist-loading situation, and the radical decrease in gas pressure drop at otherwise equal conditions shows that the effect of fiber drainage bodies is more than could have been predicted.

Figure 12:
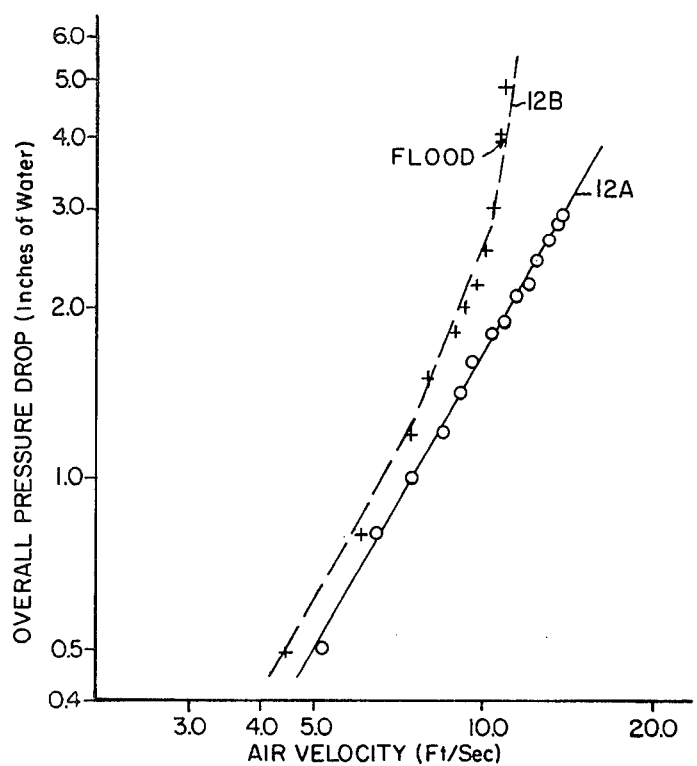
FIG. 12 is a comparison graph similar to FIG. 8, but produced with a mist eliminator in accordance with this invention including a plurality of draining bodies as shown in FIG. 11.

In the next test, the three screen rolls 88 were replaced with three rolls 90 of a ¾ inch thick bonded non-woven mat having anisotropic fiber orientation, with the preferred fiber orientation being parallel to the mat surface. The fibers 92 have a diameter of about 150 microns. Rolls of this mat 1½ inches in diameter and 3 inches long in contact with the up-stream surface of mat 84 served as the drainage bodies in the same way as the mesh rolls. The results of the test are shown graphically in the curves 12A and 12B of FIG. 12, for the dry combination in curve 12A, and the mist-loaded combination in curve 12B. Again, results similar to those shown in FIG. 10 were obtained, with a radical decrease in pressure drop resulting from the use of the anisotropic mat rolls as compared to the reference curve 8B for the mist-loaded pad 84 alone. A flood point at a velocity of about 10.5 feet/second was obtained with the anisotropic pad roll drainage members, representing a flood capacity increase of 61.5%.

Figure 14:
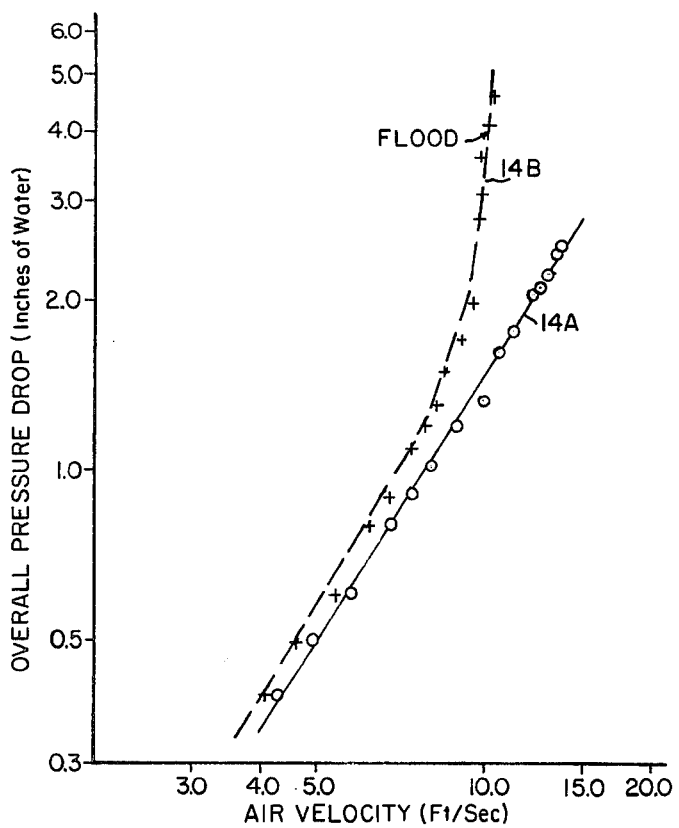
FIG. 14 is a comparison graph similar to FIG. 8, but produced with a mist eliminator according to this invention including a plurality of draining bodies as shown in FIG. 13.

The next test was performed with a mist eliminator 51 including three spirally-wound brushes 94, 2 inches in diameter and 2½ inches long, containing 0.014-inch diameter polypropylene radially-arranged bristles, in engagement with the up-stream surface of the mist-eliminator pad 84. The brushes were equally spaced apart and parallel to each other, with their longitudinal axes transverse to the vertical direction of gas flow. The dry and mist-loading run data for the brushes/pad combination are shown in FIG. 14, as curves 14A and 14B, respectively. Despite a slight decrease in the flood capacity as compared to the earlier tests on the screen-rolls 88 and cylindrical rolls of anisotropic bonded, non-woven mat 90, the brush drainage members produced a similar decrease in mist-loaded gas pressure drop and almost as great an increase in flood capacity as compared to the base case represented in FIG. 8.

Figures 15, 16:
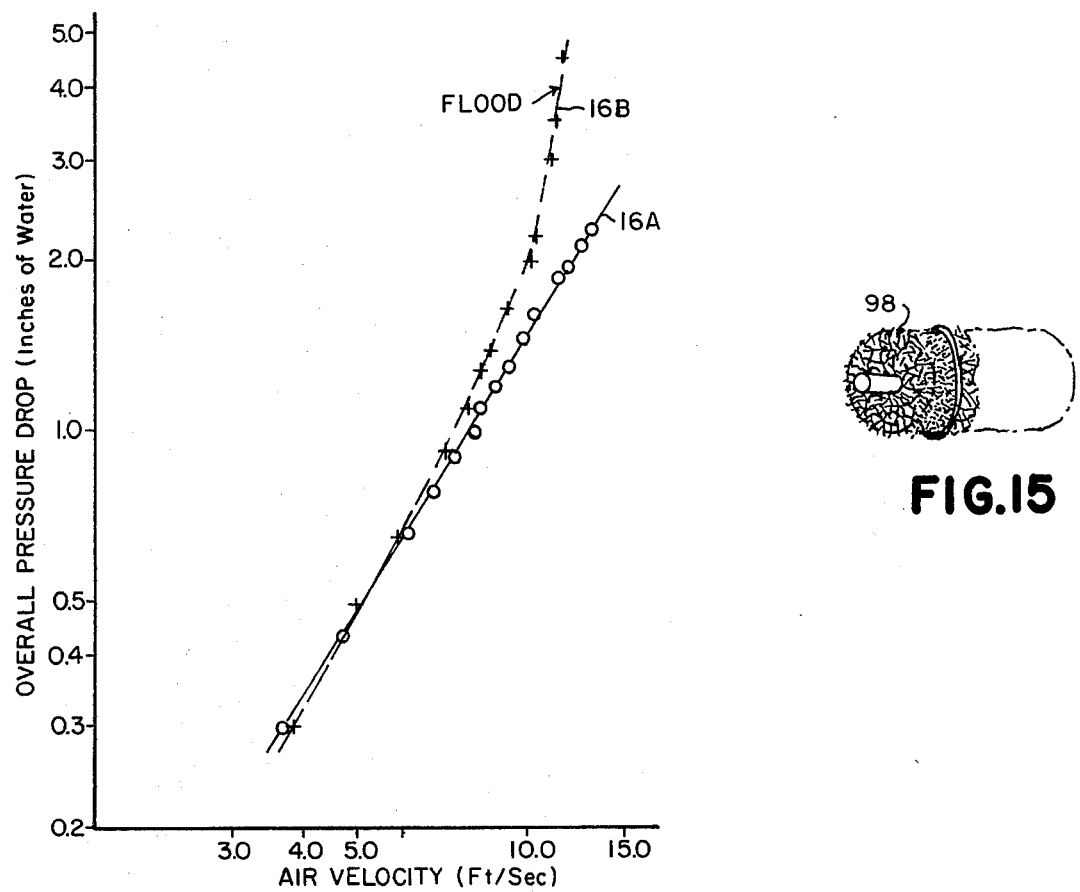
FIG. 15 is a view in perspective of a draining body of carded steel (stainless) wool of a mist eliminator according to this invention.
FIG. 16 is a comparison graph similar to FIG. 8, but produced with a mist eliminator according to this invention including a plurality of draining bodies as shown in FIG. 16.

In the next test, three 2-inch diameter, 3-inch long cylindrical rolls 98 were prepared from stainless-steel wool. The stainless steel wool had previously been carded into a mat so that the fibers were essentially parallel. The test rolls 98 of fiber were prepared by rolling the mad longitudinally into cylinders so that the metal fibers formed largely concentric rings or spirals essentially parallel to the cylinder surface. The dry and wet test results for the steel wool roll/pad combination are shown in FIG. 16. The results for the steel wool roll body 98 appear to be slightly better than those obtained with the other fibrous bodies 88, 90, 94 in that the mist-loaded pressure drop line is a bit lower than with the other bodies tested, and the flood point a bit higher.

While preferred embodiments of this invention have been disclosed, many modifications thereof are feasible. This invention is not be be restricted except insofar as is necessitated by the spirit of the prior art.

I claim:

1. For use in liquid-gas contacting apparatus, a mist eliminator including a porous pad for removing mist from a mist-containing gas of said liquid-gas contacting apparatus, which flows through said porous pad, fibrous-body means, and means for maintaining said fibrous-body means in contact with a surface of said pad for draining a liquid, resulting from the mist removed from said mist-containing gas, which accumulates above said surface, said fibrous-body means being interposed in the path of flow of said mist-containing gas to said surface of said pad but having a cross-sectional dimension which is relatively small compared to the cross-sectional dimension of said surface, said fibrous-body means thus constituting an obstruction to said gas flow of cross-sectional area which is small compared to the area of said surface so as to provide for low-resistance flow for a mist-laden gas through said fibrous-body means and said surface, the contact region between said pad and said fibrous-body means being less than the maximum transverse cross-sectional area of said fibrous-body means such that said liquid being drained flows through certain portions of said fibrous-body means, within said fibrous-body means, while substantially no streams flow through other portions of said fibrous-body means, whereby said fibrous-body means shields the liquid draining from said pad from a gas flowing in said liquid-gas-contacting apparatus.

2. The mist eliminator of claim 1, wherein the fibrous-body means is at least one fibrous body, the said at least one fibrous body being in contact, with the surface of the pad with its major axis generally parallel to said surface.

3. The mist eliminator of claim 2, wherein the vertical height of the at least one fibrous body is such that substantial hydrostatic force is impressed on the streams of liquid so that a liquid drained from said at least one body, after it emerges from the fibrous body, flows in drops of dimensions such as to resist reentrainment by a gas flowing in a gas-contacting apparatus.

4. The mist eliminator of claim 2, wherein a high proportion of the volume of the at least one fibrous body of the magnitude of 90% of the total volume of the fibrous body is void.

5. The mist eliminator of claim 2, wherein the at least one body is a roll of wire mesh of generally spiral transverse cross-sections.

6. The mist eliminator of claim 2, wherein the at least one body is a roll of bonded non-woven fabric having anisotropic fiber orientations.

7. The mist eliminator of claim 2, wherein the at least one body is a spirally-wound brush whose bristles penetrate into the porous pad.

8. The mist eliminator of claim 2, wherein the at least one body is a roll of stainless-steel wool.

9. The mist eliminator of claim 1, wherein the fibrous-body means includes a plurality of bodies in engagement with the pad, the major axis of each body being generally transverse to the flow of the mist-containing gas, the said bodies being spaced apart, the contact region between each said bodies and said pad being less than the maximum transverse cross-sectional area of each of said bodies such that said liquid being drained flows in streams through certain portions of said body within said body while substantially no streams flow through other, namely outer, portions of said body, so that said outer portions of said body shields said stream from reentrainment by a gas flowing in a liquid-gas contacting apparatus.

10. In a liquid gas contacting apparatus a method of demisting a mist-containing gas with a mist eliminator including a porous pad, a body means permeable to a liquid in said mist, and means maintaining said body means in contact with a surface of said pad, said method comprising placing said mist eliminator in the path of mist-containing gas so that said gas flows through said pad, the flow of said mist-containing gas being generally in the direction, from the up-stream surface of said porous pad to the down-stream surface of said pad, said permeable body means being in contact with the up-stream surface of said pad, the said pad removing the mist contained in said gas and collecting said mist as a liquid a portion of which accumulates above said up-stream surface of said pad, said permeable body means causing the liquid accumulated above said up-stream surface to flow in streams through the inner portion of said liquid-permeable-body means, the hydrostatic head across said liquid-permeable-body means being such that the liquid discharges from said body in drops large enough to resist reentrainment by said mist-containing gas, the contact region between said pad and said fibrous-body means being less than the maximum transverse cross-sectional area of said fibrous body means so as to shield said streams from reentrainment by said gas, and being such that the flow of said mist-containing gas through said up-stream surface and said permeable-body means is substantially uninterrupted.

11. Apparatus for treating a gas by liquid-gas contacting to remove undesirable constituents from the gas the said apparatus including a bed, means for providing a gas flowing through said bed, and means for providing a liquid counterflowing to said gas through said bed, the gas flowing through said bed being contacted by said liquid, said gas becoming mist-laden by contact with said liquid, and a mist eliminator including a porous pad, through which said mist-laden gas from said bed flows, for removing mist from said gas, the said mist eliminator also including fibrous-body means and means for maintaining said fibrous-body means in contact with a surface of said pad for draining said liquid, resulting from the mist removed from said mist-containing gas, which accumulates above said surface, said fibrous-body means being interposed in the path of flow of said mist-laden gas to said surface of said pad but having a cross-sectional dimension which is relatively small compared to the cross-sectional dimension of said surface, said fibrous-body means thus constituting an obstruction to said flow of cross-sectional area which is small compared to the area of said surface so as to provide for low-resistance flow for said mist-laden gas flowing from said bed through said pad and body means, the contact region between said pad and said fibrous-body means being less than the maximum transverse cross-sectional area of said fibrous-body means such that said liquid being drained flows through certain portions of said fibrous-body means, within said fibrous-body means, while substantially no streams flow through other portions of said fibrous-body means, whereby said fibrous-body means shields the liquid draining from said pad from reentrainment by the gas flowing from said bed to said pad.

12. For use in liquid-gas contacting apparatus, a mist eliminator including a porous pad for removing mist from a mist-containing gas of said liquid-gas contacting apparatus, which flows through said porous pad, said porous pad having a porosity such that the pores of said pad have appreciable capillarity to the flow of a liquid, fibrous-body means, and means for maintaining said fibrous-body means in contact with a surface of said pad for draining a liquid, resulting from the mist removed from said mist-containing gas, which accumulates above said surface, said fibrous-body means being interposed in the path of flow of said mist-containing gas to said surface of said pad but having a cross-sectional dimension which is relatively small compared to the cross-sectional dimension of said surface, said fibrous-body means thus constituting an obstruction to said gas flow of cross-sectional area which is small compared to the area of said surface so as to provide for low-resistance flow for a mist-laden gas through said fibrous-body means and said surface, said fibrous-body means also having at least the capillarity of said pad and being of such vertical height that the hydrostatic head through said fibrous-body means is sufficient to drain a liquid from said surface.

13. For use in liquid-gas contacting apparatus, a mist eliminator including a porous pad for removing mist from a mist-containing gas of said liquid-gas contacting apparatus, which flows through said porous pad, said porous pad having a porosity such that the pores of said pad have appreciable capillarity to the flow of a liquid, fibrous-body means, and means for maintaining said fibrous-body means in contact with a surface of said pad for draining a liquid, resulting from the mist removed from said mist-containing gas, which accumulates above said surface, said fibrous-body means being interposed in the path of flow of said mist-containing gas to said surface of said pad but having a cross-sectional dimension which is relatively small compared to the cross-sectional dimension of said surface, said fibrous-body means thus constituting an obstruction to said gas flow of cross-sectional area which is small compared to the area of said surface so as to provide for low-resistance flow for a mist-laden gas through said fibrous-body means and said surface, said fibrous-body means also having at least the capillarity of said pad and being of such vertical height that the drained liquid is expelled from said fibrous-body means in drops so large as to resist reentrainment by a counterflowing gas.

* * * * *

UNITED STATES PATENT AND TRADEMARK OFFICE
CERTIFICATE OF CORRECTION

PATENT NO. : 4,022,593

DATED : May 10, 1977

INVENTOR(S) : Bernard J. Lerner

It is certified that error appears in the above-identified patent and that said Letters Patent is hereby corrected as shown below:

Column 1, line 67; Column 2, lines 8 and 49; Column 3, lines 53, 58, 61, 63, 66; Column 6, line 11; Column 7, line 32, "demister" has been deleted.

Signed and Sealed this

Fourth Day of February 1986

[SEAL]

Attest:

Attesting Officer

DONALD J. QUIGG

Commissioner of Patents and Trademarks